United States Patent
Isenhour et al.

(10) Patent No.: US 9,239,436 B2
(45) Date of Patent: Jan. 19, 2016

(54) FIBER OPTIC PLUG HAVING AN ARTICULATED FORCE STRUCTURE TO INHIBIT ANGULAR FERRULE BIASING DURING INSERTION INTO AN OPTICAL RECEPTACLE, AND RELATED ASSEMBLIES AND METHODS

(71) Applicant: Corning Cable Systems LLC, Hickory, NC (US)

(72) Inventors: Micah Colen Isenhour, Lincolnton, NC (US); James Phillip Luther, Hickory, NC (US)

(73) Assignee: CORNING CABLE SYSTEMS LLC, Hickory, NC (US)

( * ) Notice: Subject to any disclaimer, the term of this patent is extended or adjusted under 35 U.S.C. 154(b) by 123 days.

(21) Appl. No.: 14/090,408

(22) Filed: Nov. 26, 2013

(65) Prior Publication Data

US 2015/0147036 A1     May 28, 2015

(51) Int. Cl.
*G02B 6/36*     (2006.01)
*G02B 6/38*     (2006.01)
*G02B 6/42*     (2006.01)

(52) U.S. Cl.
CPC ............ *G02B 6/3893* (2013.01); *G02B 6/3817* (2013.01); *G02B 6/3826* (2013.01); *G02B 6/3833* (2013.01); *G02B 6/3821* (2013.01); *G02B 6/3882* (2013.01); *G02B 6/3885* (2013.01); *G02B 6/4292* (2013.01)

(58) Field of Classification Search
CPC .. G02B 6/3882; G02B 6/3885; G02B 6/4292; G02B 6/3821
USPC ................. 385/53–56, 59–61, 64, 72–79, 82, 385/88–89, 92–93
IPC .............. G02B 6/3882,6/3885, 6/4292, 6/3821
See application file for complete search history.

(56) References Cited

U.S. PATENT DOCUMENTS

| | | | | |
|---|---|---|---|---|
| 5,937,123 A * | 8/1999 | Frelier | | 385/79 |
| 6,805,493 B2 * | 10/2004 | Igl et al. | | 385/88 |
| 7,429,136 B2 * | 9/2008 | Lewallen et al. | | 385/71 |
| 7,540,666 B2 * | 6/2009 | Luther | G02B 6/3821 | 385/59 |
| 7,572,063 B2 * | 8/2009 | Mynott et al. | | 385/56 |
| 8,961,033 B2 * | 2/2015 | Valencia | | 385/60 |
| 2002/0114589 A1 * | 8/2002 | Igl et al. | | 385/88 |
| 2003/0185519 A1 * | 10/2003 | Ushinsky | G02B 6/2937 | 385/72 |
| 2004/0028349 A1 * | 2/2004 | Nagasaka et al. | | 385/88 |

(Continued)

FOREIGN PATENT DOCUMENTS

WO     WO 2008/106097 A1     9/2008     ............... G02B 6/38

*Primary Examiner* — Ryan Lepisto
*Assistant Examiner* — Guy Anderson

(57) ABSTRACT

Fiber optic plug connectors having an articulated force structure to inhibit angular ferrule biasing are disclosed. An articulated force structure is provided in the fiber optic plugs to apply a forward force to a ferrule of the fiber optic plug, to dispose the fiber optic plug ferrule in close proximity to an optical interface of the optical receptacle to provide an optical connection therebetween. By the articulating force structure providing an articulating forward force to the fiber optic plug ferrule, the ferrule is able to angularly rotate to inhibit angular biasing applied to the fiber optic plug ferrule as a result of inserting the fiber optic plug into an optical receptacle. The articulating force structure providing an articulating forward force to the fiber optic plug ferrule facilitates alignment of the ferrule with the optical receptacle to preserve optical performance.

25 Claims, 13 Drawing Sheets

(56) References Cited

U.S. PATENT DOCUMENTS

| | | | |
|---|---|---|---|
| 2004/0252951 A1* | 12/2004 | Nagasaka et al. | 385/88 |
| 2007/0058907 A1* | 3/2007 | Mynott et al. | 385/61 |
| 2010/0202730 A1* | 8/2010 | Farnan | 385/25 |
| 2012/0324608 A1* | 12/2012 | Rychen | 850/53 |
| 2014/0219624 A1* | 8/2014 | Miller | 385/139 |

\* cited by examiner

FIBER OPTIC PLUG HAVING AN ARTICULATED FORCE STRUCTURE TO INHIBIT ANGULAR FERRULE BIASING DURING INSERTION INTO AN OPTICAL RECEPTACLE, AND RELATED ASSEMBLIES AND METHODS

FIELD

The technology of the disclosure relates generally to optical connections for use in electronic devices, and more particularly to optical connectors, such as fiber optic plug connectors.

BACKGROUND

As electronic devices move toward operation at faster data rates, the electrical interfaces on these devices along with the electrical transmission cables will reach their bandwidth capacity limitations. Additionally, electronic devices are trending toward having smaller and thinner footprints. Optical fibers have displaced copper-based connectivity in much of the traditional long-haul and metro telecommunication networks for numerous reasons, such as large bandwidth capacity, dielectric characteristics, and the like. As consumers require more bandwidth for consumer electronic devices, such as smart phones, laptops, and tablets as examples, optical fibers and optical ports for optical signal transmission are being considered for replacing the conventional copper-based connectivity for these applications. Benefits of optical fiber include extremely wide bandwidth and low noise operation.

In this regard, fiber optic plug connectors and optical receptacle connectors (hereinafter "fiber optic plugs" and "optical receptacles," respectively) can be provided to facilitate optical connections in electronic devices with optical fibers for the transfer of light. For example, optical fibers disposed in a fiber optic plug can be optically connected to an optical receptacle disposed in an electronic device for providing an optical connection to the electronic device. To maintain a good optical connection, the fiber optic plug is designed to have a tight, friction fit within the sidewalls of the optical receptacle when the fiber optic plug is inserted into the optical receptacle. Otherwise, the fiber optic plug may loosen within the optical receptacle during normal use. Thus, the fiber optic plug should be designed to have enough physical strength to receive an applied insertion force to overcome the sidewall resistance of the optical receptacle when the fiber optic plug penetrates the optical receptacle.

However, the ferrule in the fiber optic plug that precisely locates optical fibers within the fiber optic plug housing may be sensitive to applied insertion forces. Any biasing of the insertion forces applied to the fiber optic plug during insertion into the optical receptacle may result in misalignment of the ferrule within the fiber optic plug housing. As a result, the optical fibers supported in the ferrule of the fiber optic plug may be misaligned with the optical channels of the optical receptacle thereby causing insertion loss. Insertion loss can result in failure to provide a suitable optical connection or reduction in bandwidth.

SUMMARY

Embodiments disclosed herein include fiber optic plug connectors having an articulated force structure to inhibit angular ferrule biasing during insertion into an optical receptacle connector. Related assemblies and methods are also disclosed. As an example, the fiber optic plug connectors (hereinafter "fiber optic plugs") disclosed herein are configured to be inserted into complementary optical receptacle connectors (hereinafter "optical receptacles") disposed in an electronic device for providing an optical connection with the electronic device. An articulated force structure is provided in the fiber optic plugs disclosed herein. The articulating force structure is configured to apply a forward force to a ferrule of the fiber optic plug. The forward force applied by the articulating force structure disposes a front face of the ferrule in close proximity to an optical interface of the optical receptacle to provide an optical connection therebetween. In one non-limiting embodiment, the articulating force structure is configured to apply the articulating force along the center axis of the ferrule. Also, by the articulating force structure providing an articulating forward force to the fiber optic plug ferrule, the fiber optic plug ferrule is configured to angularly rotate about the articulating force structure if an angular biasing force is applied to the fiber optic plug ferrule as a result of inserting the fiber optic plug into a optical receptacle. In this regard, the ferrule can angularly rotate to inhibit angular biasing applied to the fiber optic plug ferrule. This angular rotation facilitates alignment of the fiber optic plug ferrule with the optical receptacle to avoid or reduce insertion loss even when an angular biasing force is applied to the fiber optic plug ferrule.

One embodiment of the disclosure relates to a fiber optic plug assembly. The fiber optic plug assembly can be provided as part of a fiber optic plug of a cable assembly as an example. The fiber optic plug assembly comprises a ferrule holder comprising an internal chamber having a front opening and a rear opening. The fiber optic plug assembly also comprises a ferrule disposed in the internal chamber of the ferrule holder. The ferrule comprises at least one ferrule bore supporting at least one optical element exposed through a front opening in a front end of the ferrule, a rear section, and an articulating force receiver disposed in the rear section. The fiber optic plug assembly also comprises an articulating force member. The articulating force member comprises an elongated member. The elongated member is engaged with the articulating force receiver to apply an articulating forward force to the ferrule, such that articulating force receiver is configured to angularly rotate about the elongated member to inhibit an angular biasing force applied to the ferrule during insertion into an optical receptacle.

Another embodiment of the disclosure relates to a method of assembling a fiber optic plug assembly. The method comprises providing a ferrule comprising at least one ferrule bore supporting at least one optical element exposed through a front opening in a front end of the ferrule, a rear section, and an articulating force receiver disposed in the rear section. The method also comprises providing at least one optical element in the at least one ferrule bore of the ferrule. The method also comprises inserting the ferrule in an internal chamber of a ferrule holder to dispose the front end of the ferrule through a front opening of the internal chamber. The method also comprises coupling an elongated member of an articulating force member with the articulating force receiver of the ferrule. The elongated member is configured to apply an articulating forward force to the ferrule, such the articulating force receiver is configured to angularly rotate about the elongated member to inhibit an angular biasing force applied to the ferrule during insertion into a optical receptacle.

Another embodiment of the disclosure relates to a fiber optic plug. The fiber optic plug comprises a fiber optic plug housing having a front end and a rear end configured to receive a cable comprising at least one optical fiber and at least one electrical conducting wire. The fiber optic plug also comprises a fiber optic plug assembly. The fiber optic plug assembly comprises a ferrule holder. The ferrule holder comprises at least one electrical conductor accessible through at least one electrical interface. The at least one electrical conductor is coupled to the at least one electrical conducting wire. The ferrule holder also comprises an internal chamber having a front opening and a rear opening, the internal chamber configured to receive a ferrule. The fiber optic plug assembly also comprises a ferrule. The ferrule is disposed in the internal chamber of the ferrule holder. The ferrule comprises at least one ferrule bore receiving the at least one optical fiber disposed adjacent at least one optical element in the at least one ferrule bore. The at least one optical element exposed through a front opening in a front end of the ferrule. The ferrule also comprises a rear section and an articulating force receiver disposed in the rear section. The fiber optic plug assembly also comprises an articulating force member. The articulating force member comprises an elongated member extending from an articulating force member. The elongated member is configured to be engaged with the articulating force receiver to apply an articulating forward force to the ferrule, such that the articulating force receiver is configured to angularly rotate about the elongated member to inhibit an angular biasing force applied to the ferrule during insertion into an optical receptacle. The fiber optic plug assembly also comprises a retention member. The retention member engages the front end of the fiber optic plug housing. The retention member receives at least one spring retaining member disposed in a rear end of the articulating force member. The at least one spring retaining member retains at least one spring disposed under compression between the rear section of the articulating force member and the retention member, such that the at least one spring applies the articulating forward force to the rear section of the ferrule.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Reference will now be made in detail to the embodiments, examples of which are illustrated in the accompanying drawings, in which some, but not all embodiments are shown. Indeed, the concepts may be embodied in many different forms and should not be construed as limiting herein; rather, these embodiments are provided so that this disclosure will satisfy applicable legal requirements. Whenever possible, like reference numbers will be used to refer to like components or parts. Various embodiments will be further clarified by the following examples.

Before discussing exemplary articulated force structures that can be included in exemplary fiber optic plug connectors to inhibit angular ferrule biasing during insertion of the fiber optic plug connector into a optical receptacle connector, an exemplary fiber optic plug connector is first described below with regard to FIGS. 1-3B.

Figure 1:
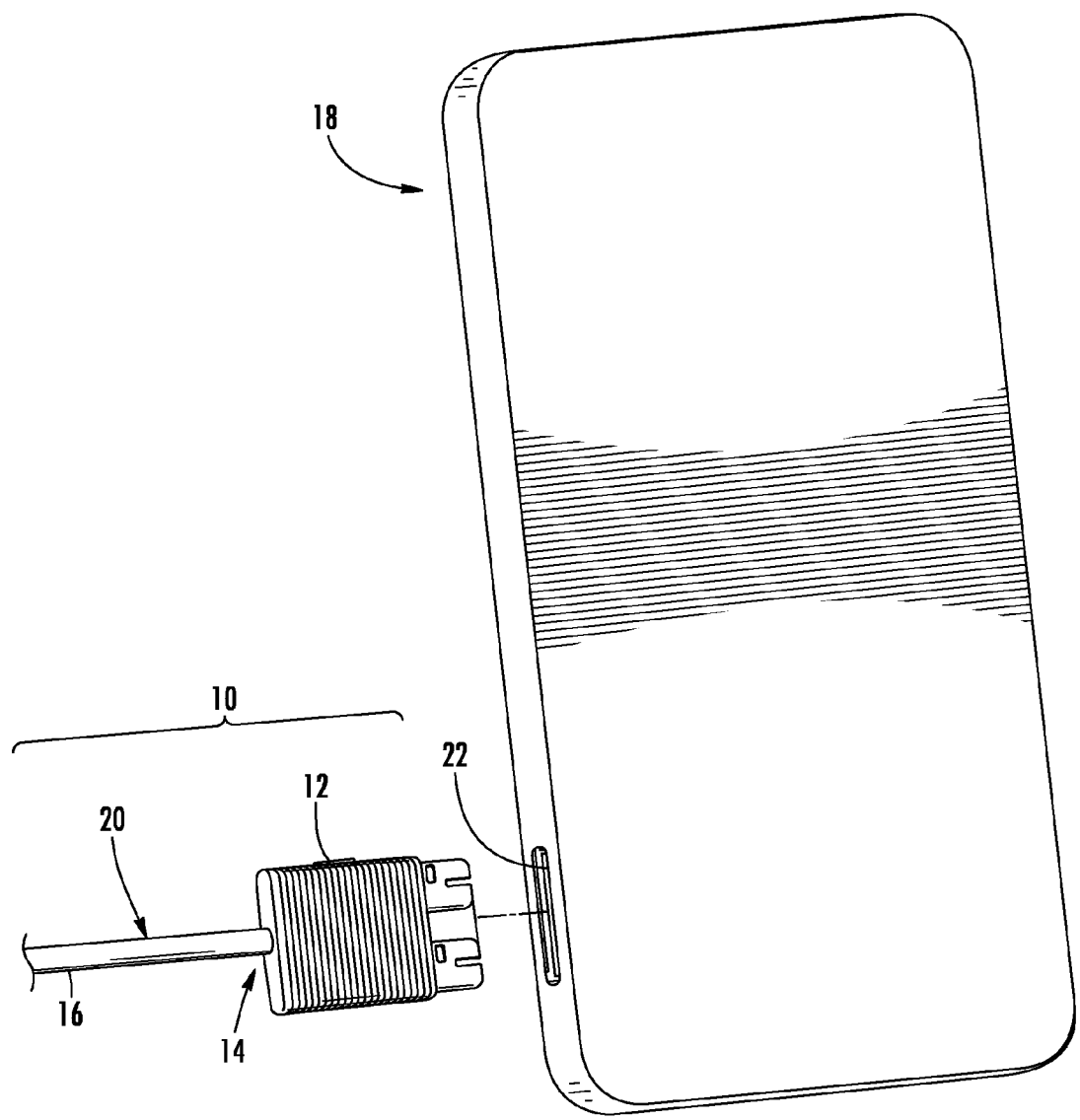
FIG. 1 illustrates an exemplary cable assembly comprising a fiber optic plug connector (hereinafter "fiber optic plug") configured to be inserted into a complementary optical receptacle connector (hereinafter "optical receptacle") of an electronic device to establish an optical connection with the electronic device, wherein the fiber optic plug has an articulated force structure for preventing or reducing angular ferrule biasing during insertion into the optical receptacle.

In this regard, FIG. 1 illustrates an exemplary cable assembly 10 comprising a fiber optic plug connector 12 (hereinafter "fiber optic plug 12") coupled to an end portion 14 of a cable 16. The cable assembly 10 provides an optical connection to an electronic device 18. One or more optical fibers 20 that can carry optical signals are provided in the cable 16 to provide optical communications. Electrical conductors (not shown) may also be included in the cable 16 to carry electrical signals, such as power signals for example. As will be discussed in more detail below, the optical fibers 20 are disposed in a ferrule optically accessible through the fiber optic plug 12 to provide an optical interface to the optical fibers 20. The fiber optic plug 12 is configured to be inserted into a complementary optical receptacle connector 22 (hereinafter "optical receptacle 22") disposed in the electronic device 18 to establish an optical connection between the cable assembly 10 and the electronic device 18. For example, the electronic device 18 may include the optical receptacle 22 as an optical interface as a replacement or addition to a conventional copper-based conductivity receptacle for higher bandwidth optical communications. Non-limiting examples of the electronic device 18 include a smart phone, laptop computer, and a tablet computer.

Figure 2A:
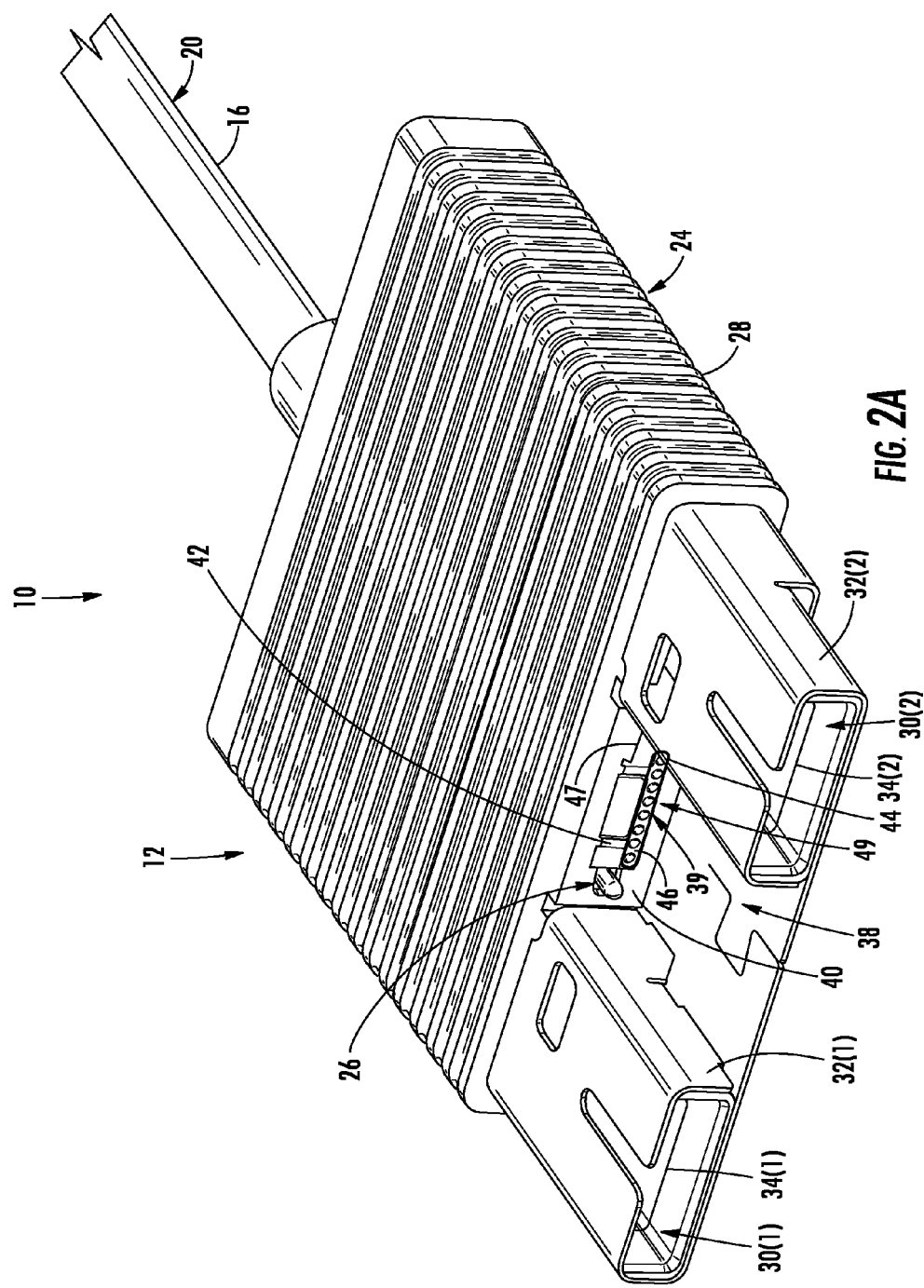
FIG. 2A is a right side, bottom perspective view of the fiber optic plug of the cable assembly in FIG. 1, the fiber optic plug comprising a removable front end assembly installed on a fiber optic plug assembly.
Figure 2B:
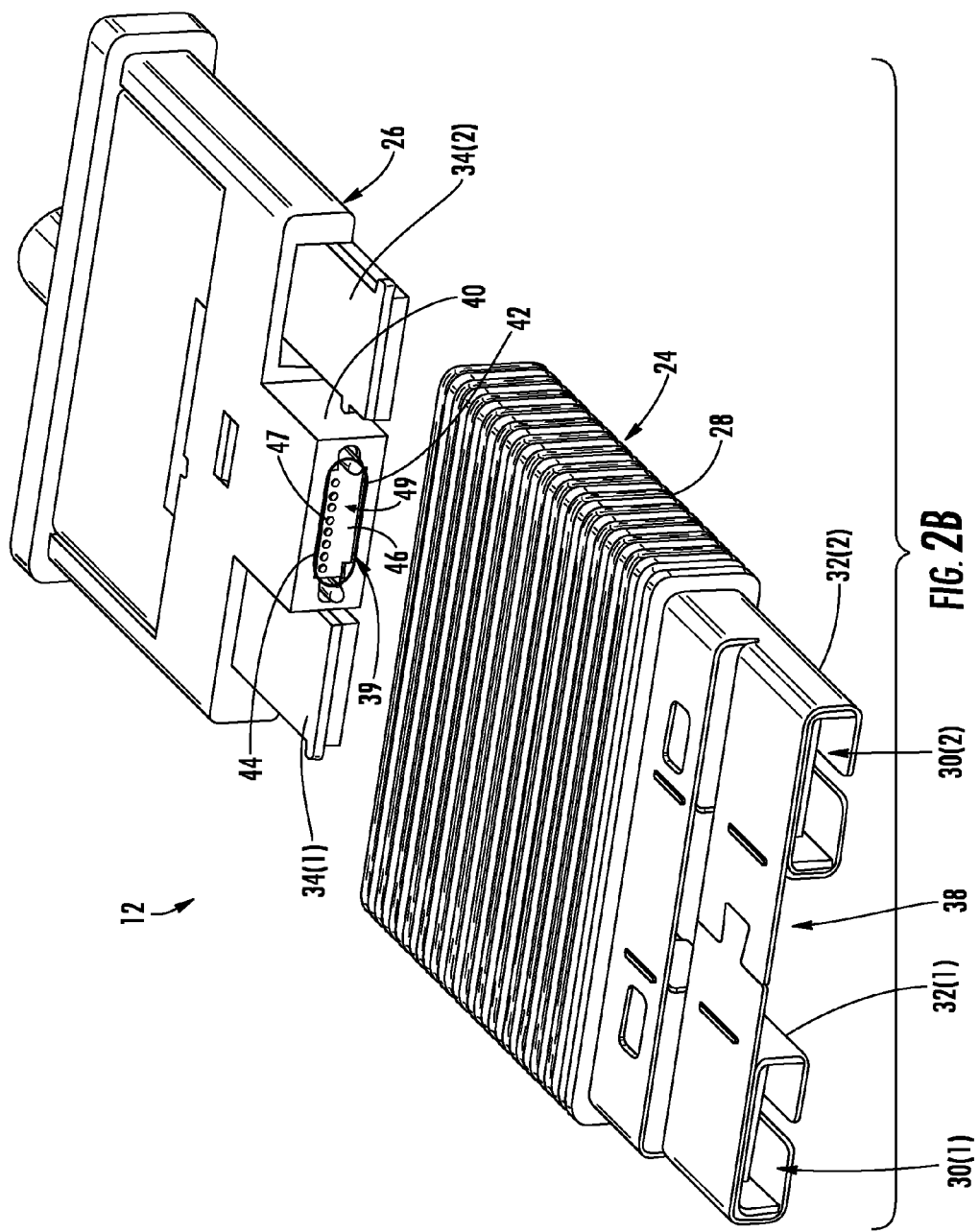
FIG. 2B is a right side, top perspective view of a removable front end assembly of the fiber optic plug of FIG. 1 removed from a fiber optic plug assembly of the fiber optic plug to illustrate the fiber optic plug ferrule exposed through a front opening of the ferrule holder of the fiber optic plug assembly.
Figure 3A:
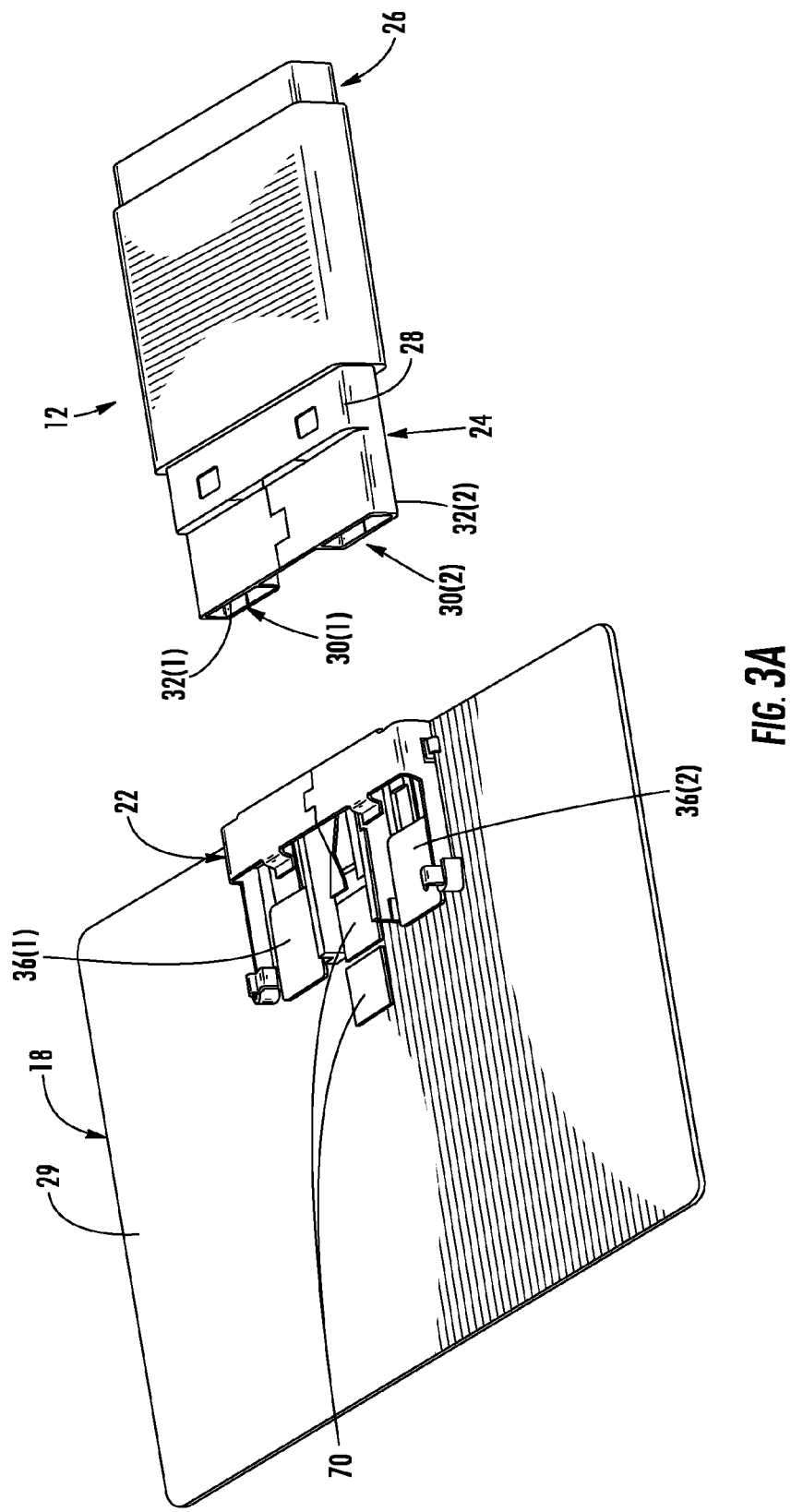
FIGS. 3A and 3B are top perspective views of the fiber optic plug of FIG. 1 readied for insertion into the optical receptacle of the electronic device of FIG. 1, and the fiber optic plug inserted into the optical receptacle of the electronic device, respectively.
Figure 3B:
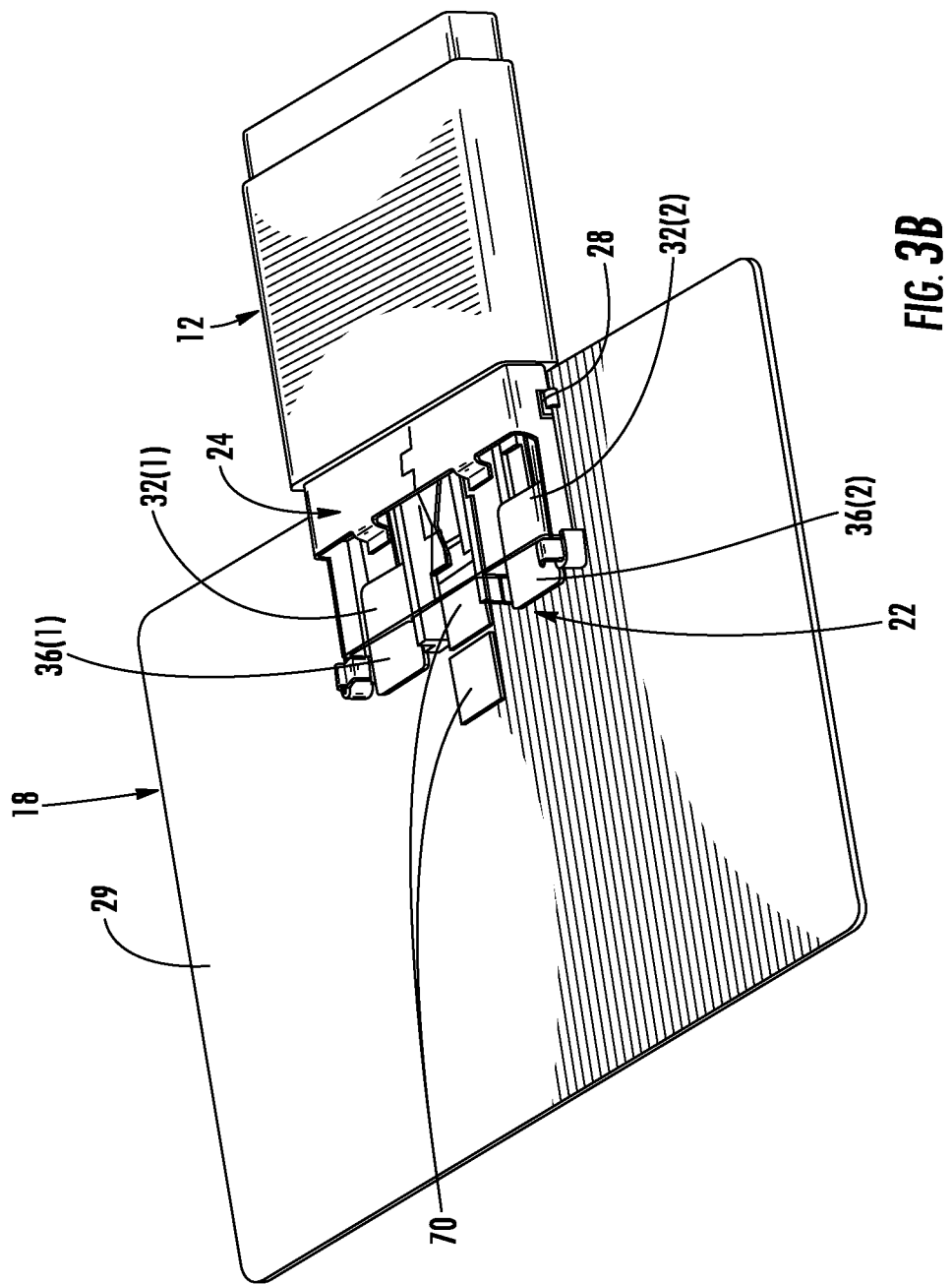

FIGS. 2A and 2B illustrate right side, bottom and top perspective views, respectively, of the fiber optic plug 12 of the cable assembly 10 in FIG. 1. The fiber optic plug 12 in this example includes an optional removable front end assembly 24 configured to receive a fiber optic plug assembly 26. FIG. 2A illustrates a bottom perspective view of the fiber optic plug 12 with the removable front end assembly 24 installed on the fiber optic plug assembly 26. FIG. 2B illustrates a top perspective view of the fiber optic plug 12 with the removable front end assembly 24 removed from the fiber optic plug assembly 26. The removable front end assembly 24 includes a removable front end body 28. The removable front end body 28 provides a form factor configured to be received in the optical receptacle 22 in the electronic device 18 in FIG. 1 to interface the electronic device 18 with the cable assembly 10. For example, FIG. 3A is a top perspective view of the fiber optic plug 12 with the removable front end body 28 readied for insertion into the optical receptacle 22 mounted on a circuit board 29 (e.g., a printed circuit board (PCB)) of the electronic device 18 of FIG. 1. FIG. 3B is a top perspective view of the fiber optic plug 12 with the removable front end body 28 inserted into the optical receptacle 22 mounted on the circuit board 29 of the electronic device 18 of FIG. 1 to establish a connection between the cable assembly 10 in FIG. 1 and the electronic device 18.

In this example, with reference to FIGS. 2A-3A, the removable front end body 28 includes two (2) electrical interface openings 30(1), 30(2) provided in the form of electrical interface shrouds 32(1), 32(2). The electrical interface shrouds 32(1), 32(2) enclose respective electrical contacts 34(1), 34(2) provided in the fiber optic plug assembly 26, as illustrated in FIG. 2B. The electrical contacts 34(1), 34(2) are coupled to respective electrical contacts 36(1), 36(2) disposed in the optical receptacle 22, as illustrated in FIG. 3A, when the fiber optic plug 12 is inserted into the optical receptacle 22 to provide an electrical interface between the cable assembly 10 and the electronic device 18 in FIG. 1. For example, electrical contacts 34(1), 34(2) may carry power signals to provide power over electrical contacts 36(1), 36(2) to the electronic device 14. The electrical interface shrouds 32(1), 32(2) facilitate alignment of the electrical contacts 34(1), 34(2) to the electrical contacts 36(1), 36(2) when the fiber optic plug 12 is inserted into the optical receptacle 22, as illustrated in FIG. 3B. In this manner, the electrical contacts 34(1), 34(2) (not shown) in the fiber optic plug 12 are aligned to be electrically coupled to electrical contacts 36(1), 36(2) in the optical receptacle 22 to establish an electrical connection therebetween.

With continuing reference to FIGS. 2A and 2B, the removable front end body 28 of the removable front end assembly 24 also includes an alignment slot 38 disposed between the two (2) electrical interface shrouds 32(1), 32(2) in this example. The alignment slot 38 is configured to receive and align a ferrule holder 40 of the fiber optic plug assembly 26 about the removable front end body 28. As will be discussed in more detail below, an internal chamber 39 of a ferrule holder 40 of the fiber optic plug assembly 26 receives a ferrule 42 to align the ferrule 42 about the ferrule holder 40. Thus, the ferrule holder 40 being received in the alignment slot 38 disposes the ferrule holder 40 and ferrule 42 in a known location within the fiber optic plug assembly 26 and fiber optic plug 12. The front end face 46 of the ferrule 42 is exposed through a front opening 47 of the internal chamber 39 of the ferrule holder 40. This alignment of the ferrule 42 aligns optical elements 44 disposed in the ferrule 42 and exposed at a front end face 46 in a front end 49 of the ferrule 42, with complementary optical elements 48 disposed in the optical receptacle 22, as discussed in more detail below with regard to FIG. 4, to provide an optical connection between the cable assembly 10 and the electronic device 18.

With continuing reference to FIGS. 2A and 2B, the removable front end body 28 also allows easy access to the ferrule 42 and the optical elements 44 disposed therein for cleaning. As illustrated in FIG. 2B, the removable front end body 28 can be removed from the ferrule holder 40 to provide access to the ferrule 42. Consequently, a cloth or other suitable device can be swiped across the front end face 46 of the ferrule 42 to clean any debris or contaminant from the optical elements 44 to inhibit optical attenuation as a result of any debris or contaminant. More details of the exemplary, optional removable front end assembly 24 provided in the fiber optic plug 12 in FIGS. 2A and 2B is disclosed in U.S. Provisional Pat. App. No. 61/823,985 filed on May 16, 2013 and entitled "OPTICAL PLUG HAVING A REMOVABLE AND REPLACEABLE NOSEPIECE AND A COMPLIMENTARY RECEPTACLE", the content of which is incorporated herein by reference in its entirety.

Figure 4:
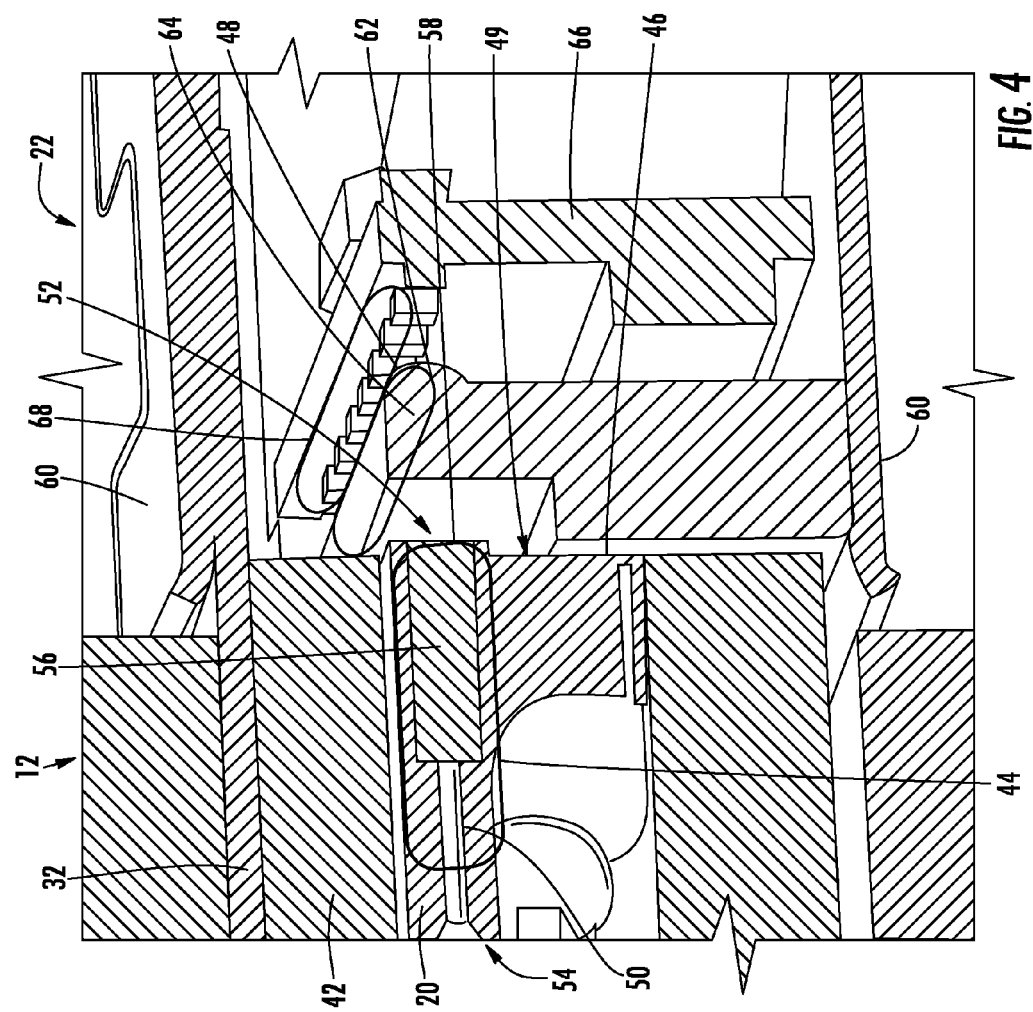
FIG. 4 is a close-up, side perspective, cross-sectional view of the fiber optic plug of FIG. 1 inserted into the optical receptacle of FIG. 1, illustrating the optical interface of a fiber optic plug ferrule that is offset from the center of the ferrule to facilitate alignment with light transmitting components such as vertical-cavity surface-emitting lasers (VCSELs) disposed on a printed circuit board (PCB) of the optical receptacle.

FIG. 4 is a close-up, side perspective, cross-sectional view of the fiber optic plug 12 of FIG. 1 inserted into the optical receptacle 22 of FIG. 1. The ferrule 42 of the fiber optic plug 12 includes one or more ferrule bores 50 supporting the optical elements 44 disposed therein and exposed through front openings 52 of the ferrule bores 50 in the front end face 46 at the front end 49 of the ferrule 42. The ferrule bores 50 are arranged in a linear array in this example. Note that FIG. 4 only illustrates one ferrule bore 50 due to being a cross-sectional view, but note that a plurality of ferrule bores 50 are provided in the ferrule 42 in this example, as illustrated in FIGS. 2A and 2B. In this example, the optical elements 44 are each comprised of an end portion 54 of an optical fiber 20 disposed against a lens 56. In this embodiment, lens 56 is a GRIN lens configured as a discrete element(s), but the lenses 56 may be molded into the ferrule if desired. A front end face 58 of the GRIN lens 56 is exposed through the front opening 52 of the ferrule bore 50. As a non-limiting example, the GRIN lenses may be disposed in the ferrule bores 50 that are configured as alignment through-holes, grooved configurations, or a combination of both, as described in PCT. Patent Application Serial Nos. PCT/US12/68144 and PCT/US12/68159 both filed on Dec. 6, 2012 along with U.S. patent application Ser. No. 13/723,643 filed on Dec. 21, 2012, which are incorporated herein by reference in their entireties.

With continuing reference to FIG. 4, when the fiber optic plug 12 is inserted in the optical receptacle 22, as illustrated in FIG. 4, a shroud 60 of the optical receptacle 22 receives the shroud 32 of the fiber optic plug 12. The front end faces 58 of the GRIN lenses 56 are aligned to optical lenses 62 disposed in a lens structure 64, which is disposed in the optical receptacle 22. The lens structure 64 transmits light between the GRIN lenses 56 and the optical lenses 62 to provide an optical interface between the fiber optic plug 12 and the optical receptacle 22. A circuit board 66 is provided in the optical receptacle 22 that contains one or more active components for transmitting/receiving optical signals. For instance a plurality of vertical-cavity surface-emitting lasers (VCSELs) 68 aligned on a circuit board are aligned with the optical lenses 62 to facilitate exchange of optical signals between the fiber optic plug 12 and the optical receptacle 22. The VCSELs 68 are offset from the center line of the circuit board 66 in this example. As illustrated in FIGS. 3A and 3B, the circuit board 29 includes one or more integrated circuits 70 for processing electrical signals to be converted into optical signals to be transmitted by the VCSELs 68 (FIG. 4) along with other components as desired for the electronic device 18 (other structure and components on the circuit board are removed for clarity purposes).

To maintain a good optical connection, the shrouds 32(1), 32(2) of the removable front end body 28 of the fiber optic plug 12 in FIGS. 2A and 2B are designed to have a friction fit within the sidewalls of the shroud 60 of the optical receptacle 22 when the fiber optic plug 12 is inserted into the optical receptacle 22. This is illustrated in FIG. 4. Otherwise, the fiber optic plug 12 may loosen within the optical receptacle 22 if disturbed. Thus, the shrouds 32(1), 32(2) of the removable front end body 28 of the fiber optic plug 12 in FIG. 1 are designed to have enough physical strength to receive an applied insertion force to overcome the sidewall resistance of the shroud 60 of the optical receptacle 22 when the fiber optic plug 12 penetrates the optical receptacle 22 in this example. However, the ferrule 42 in the fiber optic plug 12 that precisely locates the optical elements 44 disposed in the ferrule bores 50 therein may be sensitive to applied insertion forces. Any biasing of the insertion forces applied to the fiber optic plug 12 during insertion into the optical receptacle 22 may result in misalignment of the ferrule 42 within the fiber optic plug assembly 26. As a result, the optical elements 44 exposed at the front end face 46 of the ferrule 42 illustrated in FIG. 4, may be misaligned with the optical elements 62 of the optical receptacle 22 thereby causing insertion loss. Insertion loss can result in failure to provide optical connection or reduction in bandwidth between the fiber optic plug 12 and the optical receptacle 22.

Figure 5:
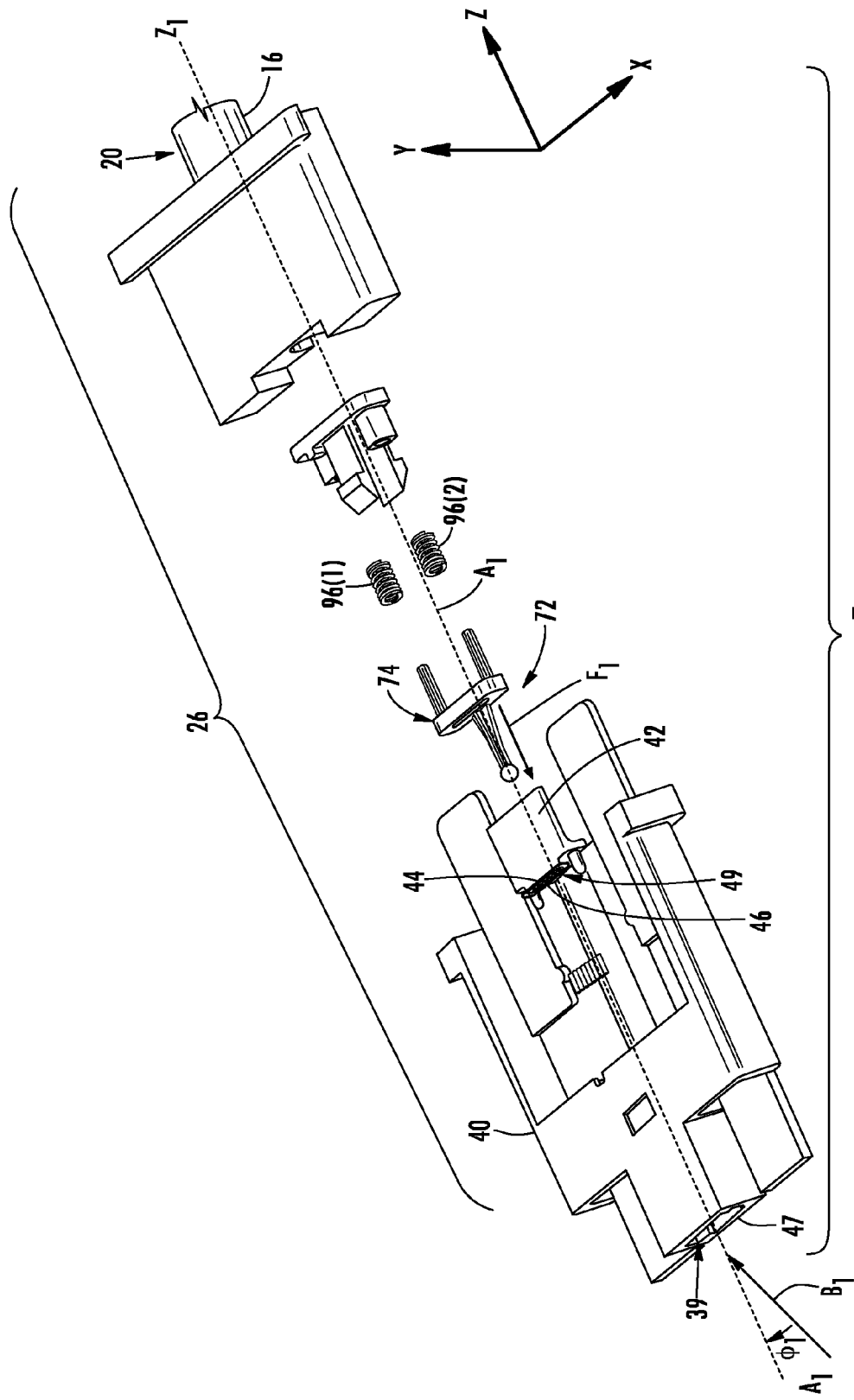
FIG. 5 is a right side, perspective exploded view of the fiber optic plug assembly in FIG. 2B of the fiber optic plug of FIG. 1.

In this regard, as illustrated in the perspective exploded view of the fiber optic plug assembly 26 in FIG. 5, the fiber optic plug 12 includes an articulating force structure 72. As will be described in more detail below with regard to FIGS. 6-8B, the articulating force structure 72 is configured to apply a forward force $F_1$ to the ferrule 42 to retain the front end face 46 of the ferrule 42 in the front opening 47. The forward force $F_1$ applied by the articulating force structure 72 disposes the optical elements 44 at the front end face 46 of the ferrule 42 in close proximity to the optical lenses 62 of the optical receptacle 22, as illustrated in FIG. 4, to provide an optical connection therebetween.

Further in this example, as will be discussed in more detail below, the articulating force structure 72 is also configured to apply the forward force $F_1$ as an articulating forward force to the ferrule 42. In this manner, the ferrule 42 is configured to angularly rotate about the articulating force structure 72 if an angular biasing force, such as angular force $B_1$, is applied to ferrule 42. For example, the angular force $B_1$ may be applied to the ferrule 42 as a result of inserting the fiber optic plug 12 into the optical receptacle 22. The angular force $B_1$ may be applied as a result of a side load placed on the ferrule 42. The articulating force structure 72 applying a forward force $F_1$ to the ferrule 42 in FIG. 5 to retain the front end face 46 of the ferrule 42 in the front opening 47 may provide enhanced, inherent mechanical stability to the ferrule 42.

In this example in FIG. 5, the articulating force structure 72 is configured to apply the articulating forward force $F_1$ along a center axis $Z_1$ (in the Z direction) of the ferrule 42, such that the illustrated biasing force $B_1$ is directed at angle $Ø_1$ with regard to the center axis $Z_1$. The ferrule 42 can angularly rotate about the center axis $Z_1$ to inhibit angular biasing applied to the ferrule 42. This angular rotation facilitates alignment of the ferrule 42 with the optical receptacle 22 to avoid or reduce insertion loss even when an angular biasing force is applied to the ferrule 42.

Figure 6:
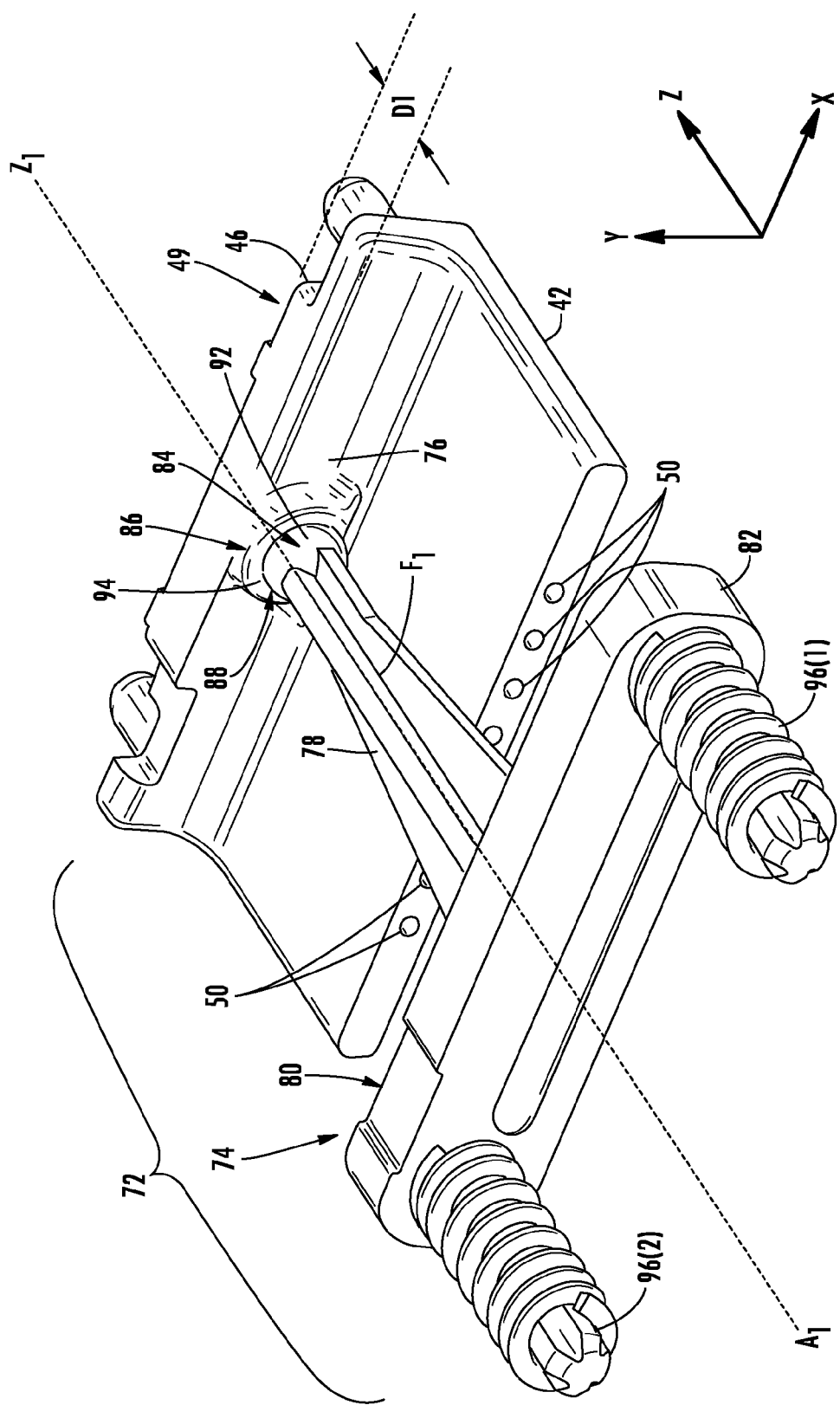
FIG. 6 illustrates a bottom perspective view of an articulated force structure engaged with the ferrule of the fiber optic plug assembly in FIG. 5 to apply a forward force along a center axis of the fiber optic ferrule to prevent or reduce angular biasing of the fiber optic plug ferule during insertion into the optical receptacle.
Figure 7A:
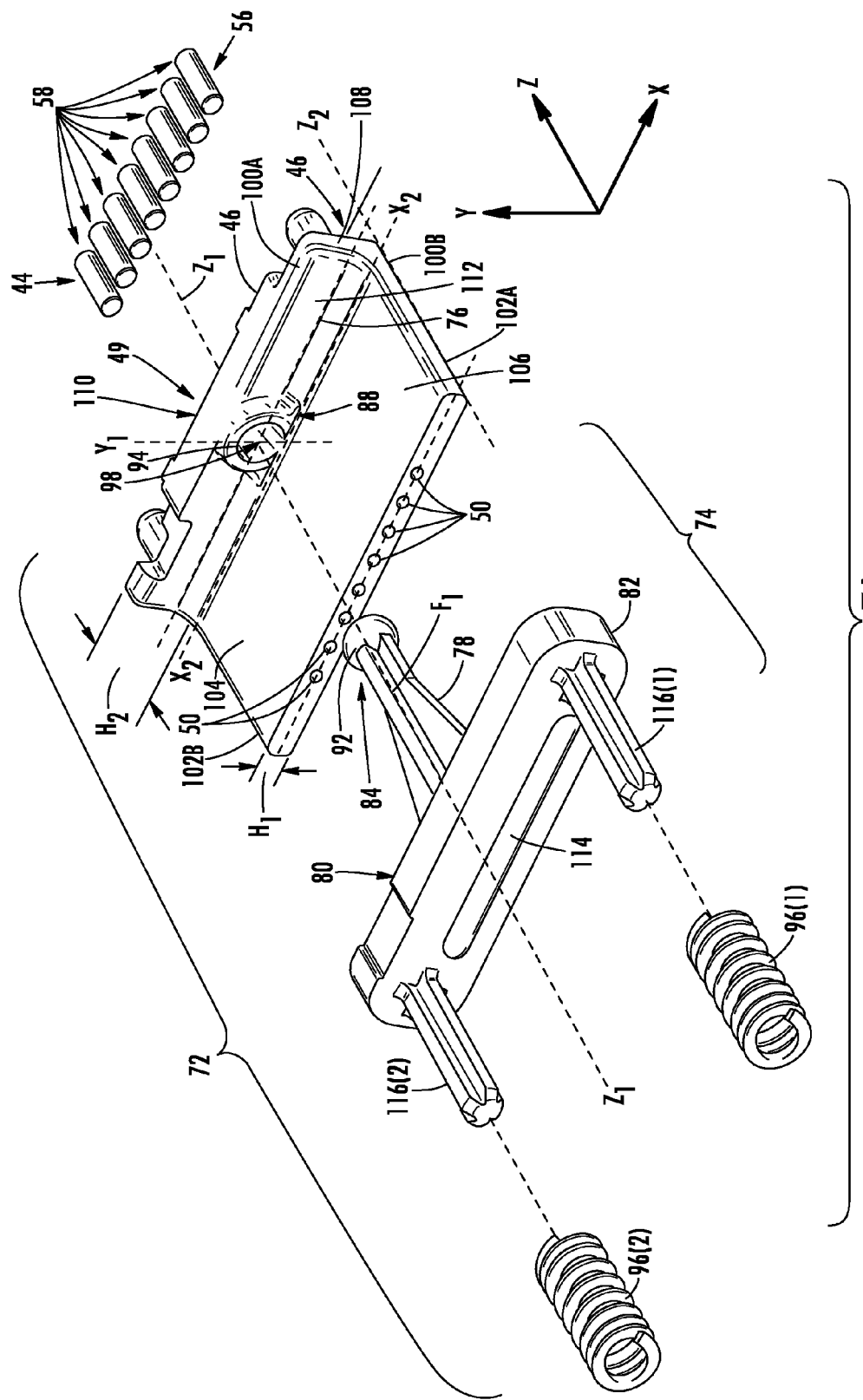
FIGS. 7A and 7B are bottom and top perspective, exploded views, respectively, of the ferrule and articulated force structure in FIG. 6.
Figure 7B:
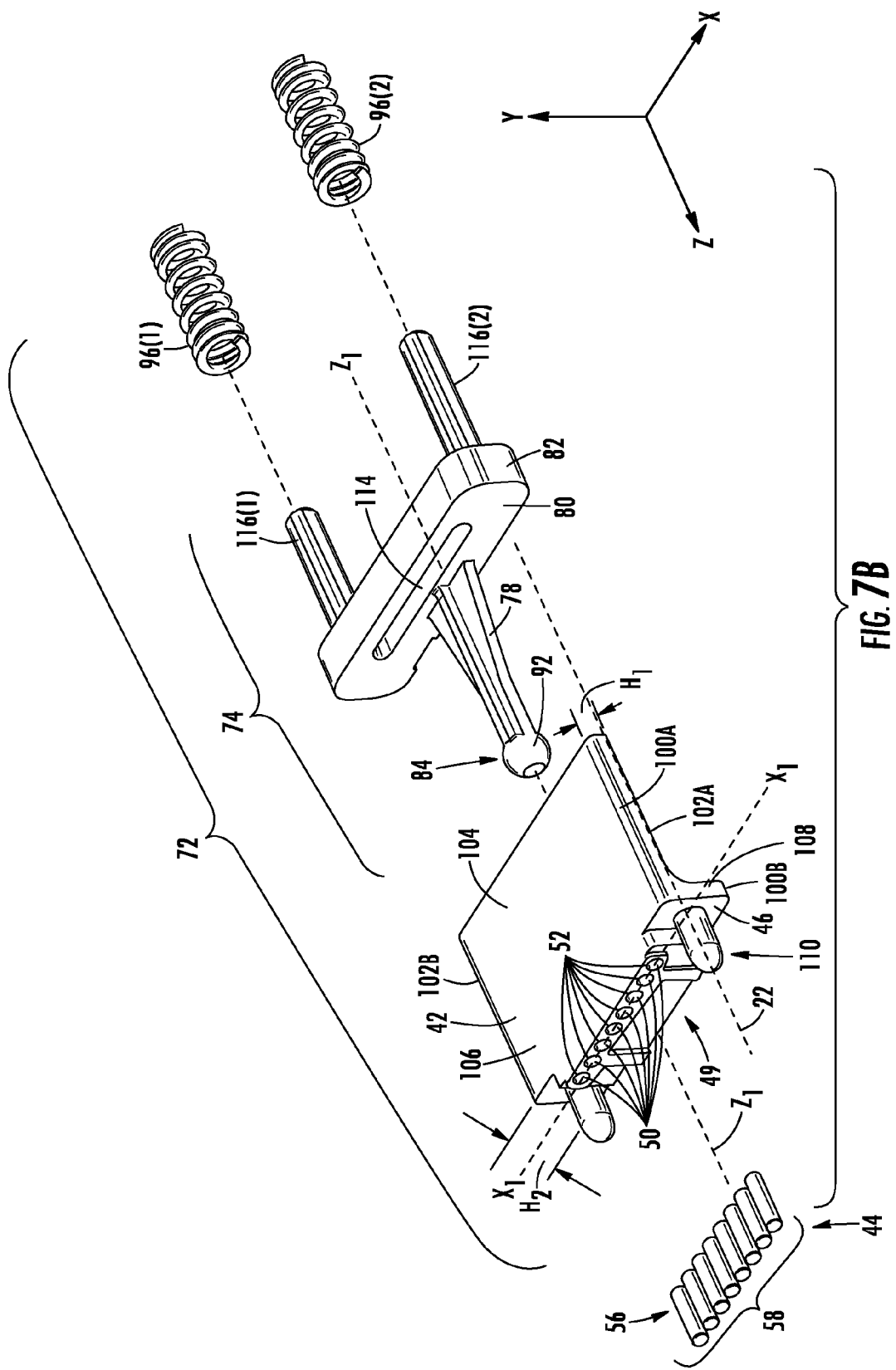

To provide more exemplary detail of the articulating force structure 72 provided in the fiber optic plug assembly 26 in FIG. 5, FIGS. 6-7B are provided and described. FIG. 6 illustrates a bottom perspective view of the ferrule 42 and articulated force structure 72. FIGS. 7A and 7B are bottom and top perspective, exploded views, respectively, of the ferrule 42 and articulated force structure 72 in FIG. 6. As illustrated in FIGS. 6-7B, the articulated force structure 72 is comprised of an articulating force member 74 configured to apply the articulating forward force $F_1$ to a rear section 76 of the ferrule 42 to retain the ferrule 42 in the internal chamber 39 of the ferrule holder 40. More specifically in this example, the articulating force member 74 is comprised of an elongated member 78 extending from a front section 80 of an articulating force body 82. An engagement member 84 is disposed on an end 86 of the elongated member 78 that is engaged with an articulating force receiver 88 disposed in the rear section 76 of the ferrule 42. In this example, the engagement member 84 is a ball member 92 that is engaged with a socket member 94 as the articulating force receiver 88 to form a ball joint. As will be discussed in more detail below, the engagement member 84 is under a spring force from springs 96(1), 96(2) under compression that provide the articulating forward force $F_1$ to the elongated member 78, which is directed to the ferrule 42 as a result of the engagement member 84 being engaged with the articulating force receiver 88 in the ferrule 42. In this manner, the ferrule 42 can angularly rotate about the engagement member 84 about the center axis $Z_1$ to inhibit angular biasing applied to the ferrule 42. This angular rotation facilitates alignment of the ferrule 42 with the optical receptacle 22 to avoid or reduce insertion loss even when an angular biasing force is applied to the ferrule 42. Because the articulating force structure 72 in this example is a ball joint, the ferrule 42 can angularly rotate in any direction.

Note that as illustrated in the example in FIG. 6, the engagement member 84 of the articulating force structure 72 is engaged with the articulating force receiver 88 in the rear section 76 of the ferrule 42 such that the point engagement is located very close to the front end face 46 of the ferrule 42. This is represented by distance $D_1$ in FIG. 6. For example, distance $D_1$ may be approximately 3.0 millimeters (mm) or less. As another example, distance $D_1$ may be approximately 1.0 millimeters (mm). Thus, the forward force $F_1$ is applied by the articulating force structure 72 close to the front end face 46 of the ferrule 42. By moving the point of engagement of the articulating force structure 72 with the articulating force receiver 88 forward towards the front end face 46 of the ferrule 42, the fulcrum created by this engagement is moved closer to the front end face 46 of the ferrule 42. This can provide for greater stability of the ferrule 42 when disposed in the ferrule holder 40 (FIG. 5) in the presence of the angular force $B_1$ shown in FIG. 5. Moving the fulcrum closer to the front end face 46 of the ferrule 42 reduces the moment of the ferrule 42 in the presence of a given angular force $B_1$, as compared to the fulcrum being located further away from the front end face 46 of the ferrule 42, With reference to FIG. 7A, the engagement member 84 is able to engage the articulating force receiver 88 in the center 98 of the ferrule 42, which is the intersection of center axis $Z_1$ with center axes $X_1$ and $Y_1$, because the ferrule bores 50 are offset from the center axis $Z_1$. This may be desired so that the ferrule 42 will angularly rotate about the center 98 of the ferrule 42 in direct proportion to angle of an articulating forward force $F_1$ applied to the ferrule 42 to dispose the front face 46 of the ferrule 42 parallel with the X axis even with a biasing force applied. This is illustrated in FIGS. 7A and 7B, where the ferrule bores 50 are disposed in the ferrule 42 parallel to axis $Z_2$ and offset from center axis $Z_1$. The ferrule bores 50 may be offset from the middle or center axis of the ferrule 42 in any suitable direction that is desired. As shown, the ferrule bores 50 are offset from the center 98 of the ferrule 42 between a top end 100A of the ferrule 42 and a bottom end 100B of the ferrule 42 (e.g., offset in the Y-direction). Thus, the ferrule bores 50 do not interfere with access to the center 98 of the ferrule 42 and the ability to dispose the articulating force receiver 88 in the center 98 of the ferrule 42 to be engaged by the engagement member 84. Alternatively, the ferrule bores 50 could be disposed in the ferrule 42 offset from the center 98 of the ferrule 42 in a direction between a first side 102A and a second side 102B of the ferrule 42 (e.g., offset in the X-direction) if desired for providing a smaller height for the plug and receptacle.

With continuing reference to FIGS. 7A and 7B, to provide for the ability of the articulating force receiver 88 to be disposed in the center 98 of the ferrule 42 in this example, the ferrule 42 is comprised of a ferrule body 104. The ferrule body 104 is comprised of an elongated body 106 having a first height H1 and a front body 108 disposed at a front end 110 of the ferrule 42. The front body 108 has a second height H2 greater than the first height H1 of the elongated body 106 in this example. The ferrule bores 50 extend through the elongated body 106 and through the front body 108 with the front openings 52 disposed through the front end face 46 of the ferrule 42 provided in the front body 108. The front body 108 extends in the Y direction perpendicular or substantially perpendicular from the elongated body 106. In this manner, the articulating force receiver 88 can be disposed in a rear side 112 of the front body 108 of the ferrule 42 to allow the ferrule 42 to allow the elongated member 78 to apply a forward force to the ferrule 42. The ferrule 42 can angularly rotate about the articulating force receiver 88 without interfering with the ferrule bores 50 and the optical fibers 20 that will be disposed therein from the cable 16 (FIG. 1).

With continuing reference to FIGS. 7A and 7B, a fiber opening 114 is also disposed in the articulating force body 82. The fiber opening 114 allows optical fibers 20 (FIG. 1) (or a ribbon or cable 16 containing the optical fibers 20) to be disposed therethrough to be able to access the ferrule bores 50 in the elongated body 106. For example, the fiber opening 114 may have any suitable width such as 5 millimeters to 25 millimeters, but other suitable dimensions are possible. Alternatively, the fiber opening 114 may be comprised of a plurality of fiber openings instead of one fiber opening as provided in fiber opening 114. The fiber opening 114 is generally aligned with the ferrule bores 50, as illustrated in FIGS. 7A and 7B, so that optical fibers 20 extending through the fiber opening 114 can be directed to the ferrule bores 50 without excessively bending or turning the optical fibers 20. As discussed above, the ferrule bores 50 are located offset from the center 98 of the ferrule 42 so that the optical fibers 20 do not interfere or prevent the engagement member 84 of the elongated member 78 from engaging the articulating force receiver 88 disposed in the center 98 of the ferrule 42.

With continuing reference to FIGS. 7A and 7B, to provide for the articulating force body 82 to be spring loaded for the elongated member 78 to apply the forward force $F_1$ to the ferrule 42, the articulating force body 82 includes two (2) spring retaining members 116(1), 116(2). The spring retaining members 116(1), 116(2) are each configured to receive respective springs 96(1), 96(2). As will be discussed in more detail below, the springs 96(1), 96(2) disposed over the spring retaining members 116(1), 116(2) are placed under compression when the fiber optic plug assembly 26 is fully assembled, so that the springs 96(1), 96(2) apply the forward force $F_1$ to the articulating force body 82, which causes the elongated member 78 to engage and apply the forward force $F_1$ to the ferrule 42. This is illustrated in FIGS. 8A and 8B discussed below.

Figure 8A:
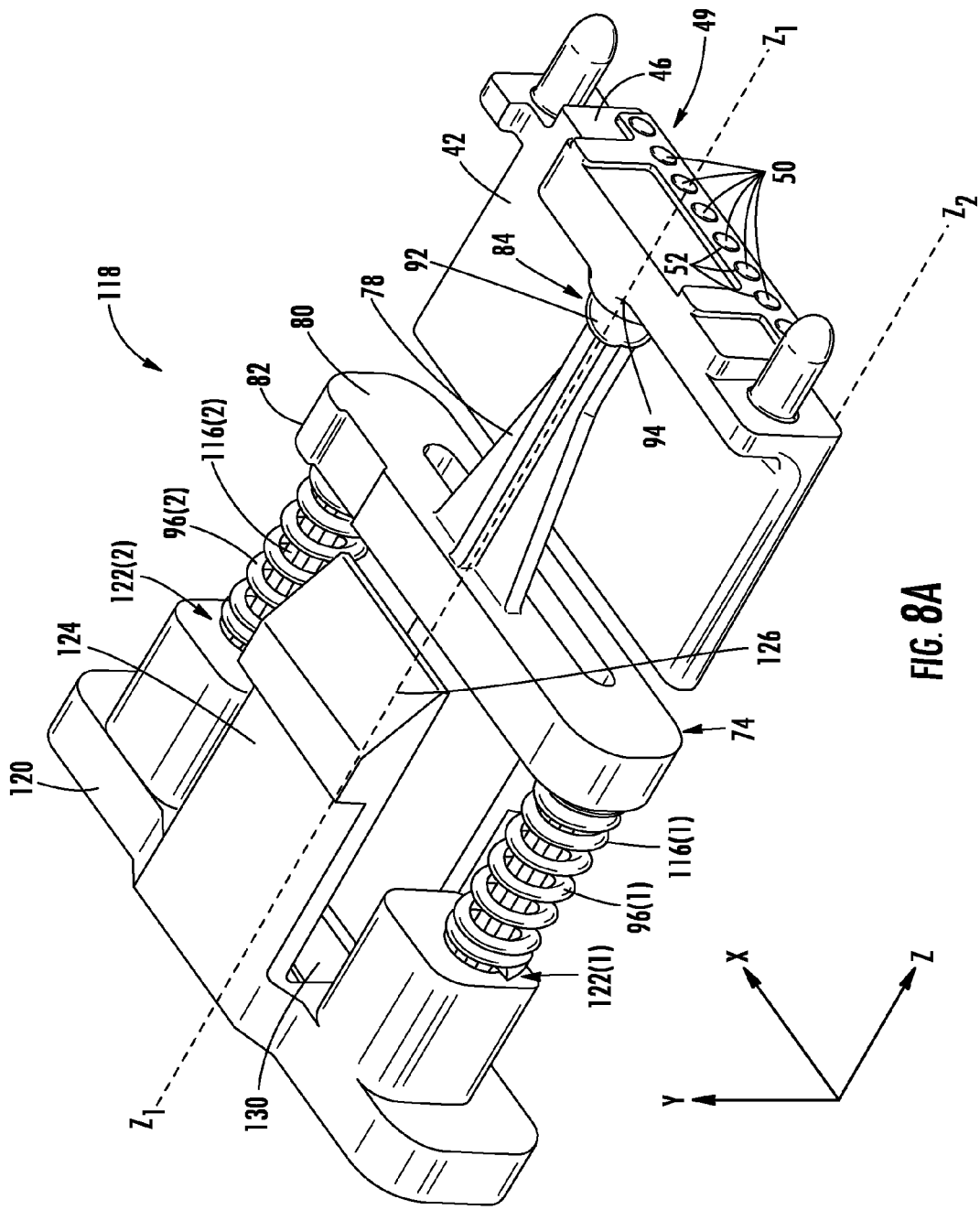
FIGS. 8A and 8B illustrate bottom and top perspective views, respectively, of a ferrule assembly of the fiber optic plug assembly of FIG. 5, that includes the ferrule and articulated force structure in FIG. 6.
Figure 8B:
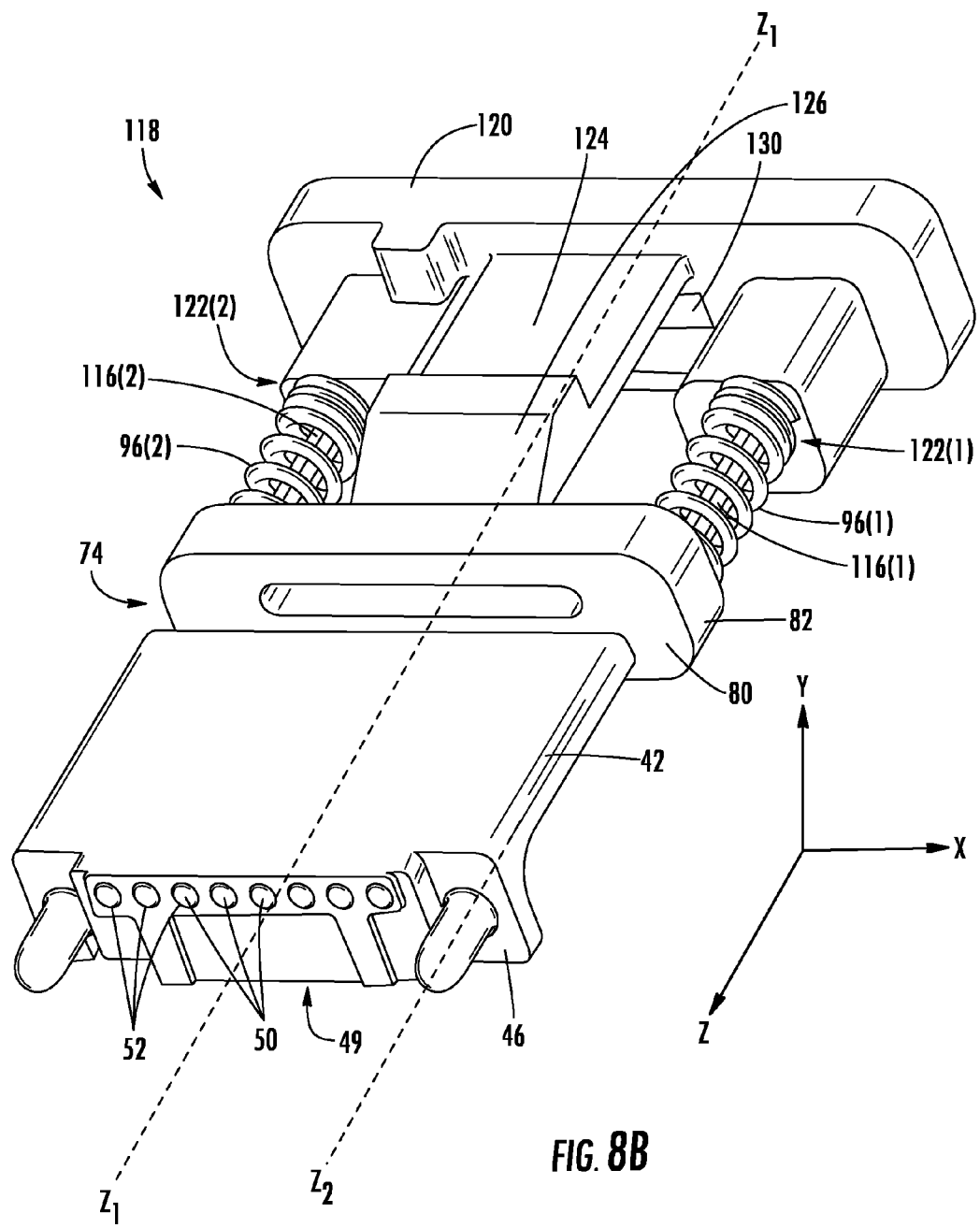

FIGS. 8A and 8B illustrate bottom and top perspective views, respectively, of a ferrule assembly 118 of the fiber optic plug assembly 26 of FIG. 5. As illustrated therein, a retention member 120 is provided. The retention member 120 includes receivers 122(1), 122(2) that are configured to receive the spring retaining members 116(1), 116(2), respectively, of the articulating force body 82 with the springs 96(1), 96(2) disposed on the spring retaining members 116(1), 116(2). In this manner, when the retention member 120 is moved forward and secured to the fiber optic plug assembly 26, the springs 96(1), 96(2) are placed under compression. In this manner, as discussed above, the compression force of the springs 96(1), 96(2) apply the forward force $F_1$ to the articulating force body 82, which causes the elongated member 78 to engage and apply the forward force $F_1$ to the ferrule 42. To fix the retention member 120 for placing the springs 96(1), 96(2) under compression, a latch 124 is disposed in the retention member 120. The latch 124 includes a forward biased locking mechanism 126 that is configured to engage with an opening 128 in the ferrule holder 40, shown in FIG. 9, when the fiber optic plug assembly 26 is fully assembled, as illustrated in FIG. 2A. The retention member 120 also includes a fiber opening 130 that allows optical fibers 20 from the cable 16 (FIG. 1) to be routed therethrough, similar to the fiber opening 114 in the articulating force body 82 shown in FIGS. 7A and 7B.

Figure 9:
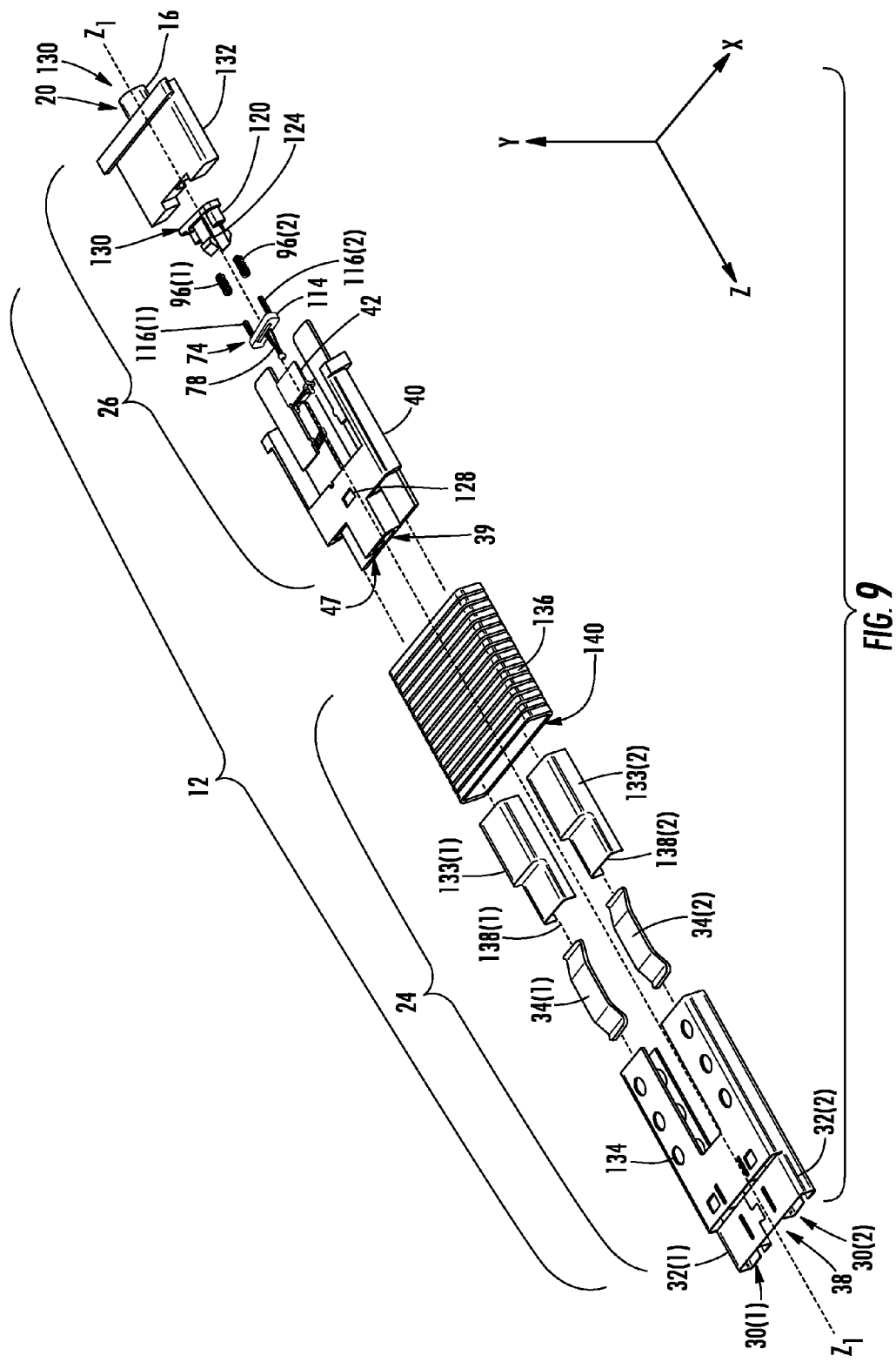
FIG. 9 is a right side, perspective exploded view of the fiber optic plug assembly of FIG. 5 aligned with a right side, perspective exploded view of the removable front end assembly of the fiber optic plug of FIG. 1.

FIG. 9 is a right side, perspective exploded view of the fiber optic plug 12 to summarize the components in the fiber optic plug assembly 26 and removable front end assembly 24 provided therein. FIG. 9 is also provided to facilitate a discussion on a method of assembling the fiber optic plug 12. In this regard, the ferrule 42 is provided. One or more optical fibers 20 from the cable 16 are exposed and routed through an opening 130 of a fiber optic plug housing 132, into the fiber opening 130 in the retention member 120, into the fiber opening 114 of the articulating force member 74 and into the ferrule bores 50 (FIGS. 8A and 8B) of the ferrule 42. The ferrule 42 is inserted into the internal chamber 39 of the ferrule holder 40 to dispose the front end face 46 (not shown) of the ferrule 42 through the front opening 47 of the internal chamber 39. The springs 96(1), 96(2) are disposed on the spring retaining members 116(1), 116(2). The fiber optic plug housing 132 is brought forward to engage the retention member 120, which engages the spring retaining members 116(1), 116(2) to engage the articulating force body 82 to push the ferrule 42 forward into the internal chamber 39. The elongated member 78 of the articulating force member 82 is engaged with the articulating force receiver 88 (FIG. 7A) of the ferrule 42. The latch 124 is brought forward as a result, which engages opening 128 in the ferrule holder 40 to place the springs 96(1), 96(2) under compression and to assemble the fiber optic plug assembly 26. The removable front end assembly 24 is then disposed on the fiber optic plug assembly 26 to assemble the fiber optic plug 12.

FIG. 9 also illustrates an exploded view of the removable front end assembly 24 of the fiber optic plug 12. In this regard, the removable front end assembly 24 has one or more electrical contacts 34(1), 34(2), as previously described, one or more rails 133(1), 133(2), a shell 134, and a grip 136. When assembled, the electrical contacts 34(1), 34(2) fit into respective guides 138(1), 138(2) of the rails 133(1), 133(2), respectively. The rails 133(1), 133(2) and the electrical contacts 34(1), 34(2) fit into and attach to respective shrouds 32(1), 32(2). In this embodiment, the rails 133(1), 133(2) are generally flush with the front end 140 of shell 136, but other arrangements are possible. The rail(s) 133(1), 133(2) may be attached to the shrouds 32(1), 32(2) in any suitable manner. As depicted, the shrouds 32(1), 32(2) of shell 134 are disposed on opposite sides of the alignment slot 38. The alignment slot 38 allows the shell 134 and the shrouds 32(1), 32(2) to fit about the fiber optic plug assembly 26.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

We claim:

1. A fiber optic plug assembly, comprising:
   a ferrule holder comprising an internal chamber having a front opening and a rear opening;
   a ferrule disposed in the internal chamber of the ferrule holder, the ferrule comprising:
      at least one ferrule bore supporting at least one optical element exposed through a front opening in a front end of the ferrule,
      a rear section,
      an articulating force receiver disposed in the rear section, and
      a ferrule body comprising an elongated body having a first height and a front body disposed at the front end of the ferrule, the front body having a second height greater than the first height of the elongated body, the at least one ferrule bore extending through the elongated body and through the front body to the front end of the ferrule; and
   an articulating force member comprising an elongated member engaged with the articulating force receiver to apply an articulating forward force to the ferrule, wherein the articulating force receiver is configured to angularly rotate about the elongated member to inhibit an angular biasing force applied to the ferrule during insertion into an optical receptacle.

2. The fiber optic plug assembly of claim 1, wherein the articulating force receiver is disposed in the rear section of the ferrule approximately 3.0 millimeters (mm) or less from the front end of the ferrule.

3. The fiber optic plug assembly of claim 2, wherein the articulating forward member applies the articulating forward force to the rear section of the ferrule located approximately 3.0 millimeters (mm) or less from the front end of the ferrule.

4. The fiber optic plug assembly of claim 1, wherein the articulating force receiver is disposed in a center axis of the ferrule extending between the front end of the ferrule and the rear section of the ferrule.

5. The fiber optic plug assembly of claim 4, wherein the at least one ferrule bore is offset from at least one center axis of the ferrule.

6. The fiber optic plug assembly of claim 5, wherein the at least one ferrule bore is offset from the at least one center axis of the ferrule.

7. The fiber optic plug assembly of claim 1, wherein the articulating force receiver is comprised of a socket, and further comprising a ball disposed on an end of the elongated member, the ball engaged in the socket.

8. The fiber optic plug assembly of claim 1, wherein the front body of the ferrule body is disposed perpendicular or substantially perpendicular to the elongated body.

9. The fiber optic plug assembly of claim 1, wherein the elongated member extends along an axis in a direction between the rear section of the ferrule and the front end of the ferrule.

10. The fiber optic plug assembly of claim 1, further comprising at least one fiber opening disposed in the articulating force member offset from the elongated member, the at least one fiber opening configured to receive at least one optical fiber to be disposed in the at least one ferrule bore as the at least one optical element.

11. The fiber optic plug assembly of claim 1, further comprising a retention member configured to receive at least one spring retaining member disposed in a rear end of an articulating force body of the articulating force member, the at least one spring retaining member retaining at least one spring disposed under compression between the rear end of the articulating force body and the retention member, the at least one spring applying the articulating forward force to the ferrule.

12. The fiber optic plug assembly of claim 11, wherein the at least one spring retaining member is comprised of two spring retaining members disposed on opposite sides of the elongated member.

13. The fiber optic plug assembly of claim 11, wherein the retention member further comprises a latch configured to be received in a latch opening disposed in the ferrule holder to direct a compression force in the at least one spring to the ferrule to maintain the front end of the ferrule at the front opening of the ferrule holder.

14. The fiber optic plug assembly of claim 1, further comprising at least one electrical contact disposed in at least one electrical interface opening disposed in at least one second front opening of the ferrule holder.

15. The fiber optic plug assembly of claim 1, further comprising a removable front end assembly comprising a removable front end body having an alignment slot configured to receive and align the ferrule holder about the removable front end body.

16. The fiber optic plug assembly of claim 1 provided in part of a cable assembly.

17. The fiber optic plug assembly of claim 1, wherein the at least one optical element is comprised of at least one gradient index (GRIN) lens.

18. A method of assembling a fiber optic plug assembly, comprising:
   providing a ferrule comprising at least one ferrule bore supporting at least one optical element exposed through a front opening in a front end of the ferrule, a rear section, an articulating force receiver disposed in the rear section, and a ferrule body comprising an elongated body having a first height and a front body disposed at the front end of the ferrule, the front body having a second height greater than the first height of the elongated body, the at least one ferrule bore extending through the elongated body and through the front body to the front end of the ferrule;

providing at least one optical element in the at least one ferrule bore of the ferrule;

inserting the ferrule in an internal chamber of a ferrule holder to dispose the front end of the ferrule through a front opening of the internal chamber; and coupling an elongated member of an articulating force member with the articulating force receiver of the ferrule, the elongated member applying an articulating forward force to the ferrule, wherein the articulating force receiver is configured to angularly rotate about the elongated member to inhibit an angular biasing force applied to the ferrule during insertion into an optical receptacle.

19. The method of claim 18, further comprising coupling the elongated member of the articulating force member with the articulating force receiver disposed in the rear section of the ferrule approximately 3.0 millimeters (mm) or less from the front end of the ferrule.

20. The method of claim 19, further comprising disposing at least one optical fiber through at least one fiber opening disposed in the articulating force member offset from the elongated member.

21. The method of claim 19, further comprising:
disposing at least one spring on at least one spring retaining member disposed in a rear end of the articulating force member; and
inserting the at least one spring retaining member in a retention member to place the at least one spring under compression between the rear end of the articulating force member and the retention member, the at least one spring applying the articulating forward force to the ferrule.

22. The method of claim 19, further comprising receiving the ferrule holder in an alignment slot disposed in a removable front end assembly to attach the removable front end assembly to the ferrule holder to align the ferrule holder about the removable front end assembly.

23. The method of claim 19, further comprising inserting the fiber optic plug assembly in a optical receptacle to optically connect the at least one optical element in the fiber optic plug assembly to at least one optical element disposed in the optical receptacle.

24. The method of claim 19, wherein coupling the elongated member of the articulating force member with the articulating force receiver of the ferrule further comprises coupling the elongated member of the articulating force member with the articulating force receiver disposed in a center of the ferrule.

25. A fiber optic plug, comprising:
a fiber optic plug housing having a front end and a rear end configured to receive a cable comprising at least one optical fiber and at least one electrical conducting wire;
a fiber optic plug assembly, comprising:
a ferrule holder comprising at least one electrical conductor accessible through at least one electrical interface, the at least one electrical conductor coupled to the at least one electrical conducting wire, and further comprising an internal chamber having a front opening and a rear opening, the internal chamber configured to receive a ferrule;
a ferrule disposed in the internal chamber of the ferrule holder, the ferrule comprising at least one ferrule bore receiving the at least one optical fiber disposed adjacent at least one optical element in the at least one ferrule bore, the at least one optical element exposed through a front opening in a front end of the ferrule, a rear section, and an articulating force receiver disposed in the rear section of the ferrule; and
an articulating force member comprising an elongated member extending from an articulating force body, the elongated member configured to be engaged with the articulating force receiver to apply an articulating forward force to the ferrule, wherein the articulating force receiver is configured to angularly rotate about the elongated member to inhibit an angular biasing force applied to the ferrule during insertion into an optical receptacle; and
a retention member engaging the front end of the fiber optic plug housing, the retention member receiving at least one spring retaining member disposed in a rear end of the articulating force body, the at least one spring retaining member retaining at least one spring disposed under compression between the rear end of the articulating force body and the retention member, the at least one spring applying the articulating forward force to the rear section of the ferrule.

* * * * *